United States Patent [19]

Harrison, deceased

[11] E Re. 31,321

[45] Reissued Jul. 26, 1983

[54] SOLAR HEATING SYSTEM

[75] Inventor: Henry Harrison, deceased, late of Locust Valley, N.Y., by Dorothy D. Harrison, administratrix

[73] Assignee: Halm Industries Co. Inc., Glen Head, N.Y.

[21] Appl. No.: 227,510

[22] Filed: Jan. 22, 1981

Related U.S. Patent Documents

Reissue of:

[64] Patent No.: 4,237,863
Issued: Dec. 9, 1980
Appl. No.: 817,335
Filed: Jul. 20, 1977

U.S. Applications:

[63] Continuation of Ser. No. 677,265, Apr. 15, 1976, abandoned.

[51] Int. Cl.[3] ..... F24J 3/02

[52] U.S. Cl. ..... 126/422; 126/432; 126/444

[58] Field of Search ..... 126/449, 422, 432, 437, 126/450

[56] References Cited

U.S. PATENT DOCUMENTS

| | | | |
|---|---|---|---|
| 705,350 | 7/1902 | Hubert | 126/434 |
| 1,240,890 | 9/1917 | Shuman et al. | 126/425 |
| 3,387,602 | 6/1968 | Thomason | 126/449 |
| 3,875,926 | 4/1975 | Frank | 126/433 |
| 3,886,998 | 6/1975 | Rowekamp | 126/449 |
| 3,918,430 | 11/1975 | Stout et al. | 126/448 |
| 3,957,109 | 5/1976 | Worthington | 126/429 |
| 3,991,742 | 11/1976 | Gerber | 126/426 |
| 4,007,776 | 2/1977 | Alkasab | 126/422 |
| 4,010,734 | 3/1977 | Chayet | 126/422 |

OTHER PUBLICATIONS

Modern Plastics Encyclopedia issue for 1959, vol. 36, Number 1A-Breskin Publications Inc., and Plastics Catalog Co., Emmett St., Bristol, Conn., pp. 619 & 622.

*Primary Examiner*—Carroll B. Dority, Jr.
*Attorney, Agent, or Firm*—James P. Malone

[57] ABSTRACT

A solar heating system. A roof mounted panel collects heat from the sun. The panel having an upper sunlight-absorbing surface. A translucent cover is mounted above the panel to protect it from the weather. The panel has a lower surface for heat transfer to a stream of water. The panel is mounted in cooperative relation with a roof to form a passage for the stream of water. Means are connected to the panel for maintaining the stream of water in substantially uniform contact with said lower surface of the panel. Insulated tank means connected for receiving and storing the stream of water. Means are provided for controlling the stream of water under the panel in response to the temperature of the panel and the water in the tank, whereby the water collects heat from the panel only at useful temperatures. Air stream means are provided for preventing the roof from overheating.

10 Claims, 2 Drawing Figures

SOLAR HEATING SYSTEM

Matter enclosed in heavy brackets [ ] appears in the original patent but forms no part of this reissue specification; matter printed in italics indicates the additions made by reissue.

This is a continuation of application Ser. No. 677,265, filed Apr. 15, 1976, and now abandoned.

This invention relates to systems for house heating in which radiant energy from the sun is absorbed by a coated metal panel, which is protected from heat loss by one or more transparent or translucent covers separated by insulating air space. Heat collected by the panel is transferred to a flowing water stream which is then collected in a storage tank for use in house heating.

Solar heating systems for use in temperature climates, in addition to collecting solar radiation with reasonable efficiency, must be able to endure freezing temperatures, and also must be able to survive the high rates of heating arising in bright sun conditions when the flowing water stream is not flowing and thus not carrying away heat. This invention includes a thermal control and a pump which raises water from the storage tank to the top edge of the collector when heat transfer is called for. This water then flows down by gravity in contact with the coated metal panel, picking up heat from the panel. Collected at the bottom edge it pours back into the storage tank. Since the water is not in the collector in freezing weather, it does not freeze. In some known collectors the flowing water stream is between the metal panel and the transparent cover. That tends to wear away the sun-absorbing coating on the metal and also to reduce the light transmittance of the cover. In this invention the water flows in contact with the bottom of the metal panel, not through the insulating air space, thus eliminating these two sources of inefficiency.

Provision must be made to bring the water flowing below the metal plate into contact with the lower surface of the plate, so that it can pickup heat by conduction. The flow of water should be uniform across the width of the plate and the contact should be continuous in order to transfer heat with maximum efficiency. In prior art devices it has proved to be difficult to maintain these two conditions because the flow pattern is strongly dependent on the spacing of the plate from the back wall of the flow passage, and the thickness of the water layer in an unconfined stream is unstably related to its speed. To overcome this instability, the flow passage is made resistive by filling it with a mat of wettable fibers of suitable non-degradable composition, such as fiberglass. In addition to stabilizing the flow, this fibrous mat acts as a wick to maintain contact between the water and the lower surface of the metal plate.

In conventional collectors, the water passage has a front member exposed to sunlight and a back member which supports the flowing water in thermal contact with the front member. When the water flow pattern is not sensitive to the spacing between these two members, as in the fibrous mat of the present invention, an ordinary roof can perform the function of the back member. Roofing is well developed to support water flow and to endure the temperature extremes of weather for long periods of time.

If the flow of water in a solar collector is interrupted during a period of sunlight, the collector plate may reach temperatures too hot for ordinary roofing. While heat flow to the roofing is slowed by the intervening fiber mat, heat flow away from the roof is impeded much more by the normal house insulation behind or below the roof, and therefore additional provision must be made to remove heat from the roof in these special circumstances. In this invention, cool ambient air is allowed to circulate in the inclined space between the roof boards and the house insulation. By cooling the hot, roof boards, which are in reasonable thermal contact with the roofing, this air flow keeps the roofing from reaching damaging temperatures. Natural circulation takes place when the passage is open at the bottom and the top to outside air. When water flow is going on, this passage is closed by a flap or louvre which prevents unwanted heat loss from the water stream. While actuation of the flap could be accomplished by well-known thermostatic means responsive to the temperature in the air space, it is believed simpler and more effective to close the flap by means of a leaky bucket filled by the circulating water flow. When the water is not flowing the bucket is light and the passage opens, but when the water is flowing, the bucket is heavy and the passage is shut.

The collector of this invention, which does not require a stiff sealed water flow passage or formal water connections for each panel, is made flexible and tough by employing a thin flexible metal absorber plate and flexible translucent covers and substituting a flexible edge seal strip for the rigid frame or box which is conventional in solar collector panels. The absorber plate and the covers are spaced apart by a few small posts cemented in place. The assembly keeps the insulating air spaces within the cover free of moisture and dirt, and sufficiently flexible and tough to conform to a normal roof surface and withstand the stresses of storage, shipping and mounting on the roof.

Accordingly, it is the principal object of this invention to provide an efficient, durable, low cost solar heating system which utilizes water to transfer and store the heat.

Another object is to provide a collector, having a sun-absorbing surface protected by a moisture-free top air space, in substantially uniform thermal contact with a water stream.

Another object is to provide a collector which mounts on a conventional roof and uses that roof to support the water stream and normal house insulation to prevent heat loss from the bottom of the water stream.

Another object is to provide a means for preventing the roof from getting too hot when water is not flowing.

Another object is to provide a means for regulating the temperature of the water delivered from the collector to the storage tank.

Another object is to provide a solar heating system having at least one roof mounted panel for collecting heat from the sun, said panel having an upper sunlight-absorbing surface at least one translucent cover mounted above the panel to protect it from the weather, said panel having a lower surface for heat transfer to a stream of water, means for mounting said panel in cooperative relation with a roof to form a passage for said stream of water, means connected to said panel for maintaining said stream of water in substantially uniform contact with said lower surface of said panel, insulated tank means connected for receiving and storing said stream of water, and means for controlling said stream of water under said panel in response to the temperature of said panel and said water in said tank, whereby said water collects heat from said panel at useful temperatures, and air stream means for preventing said roof from overheating.

From the following description and the drawings of one embodiment of this invention it will be clear to one skilled in the art how these and other objects are achieved.

Figure 1:
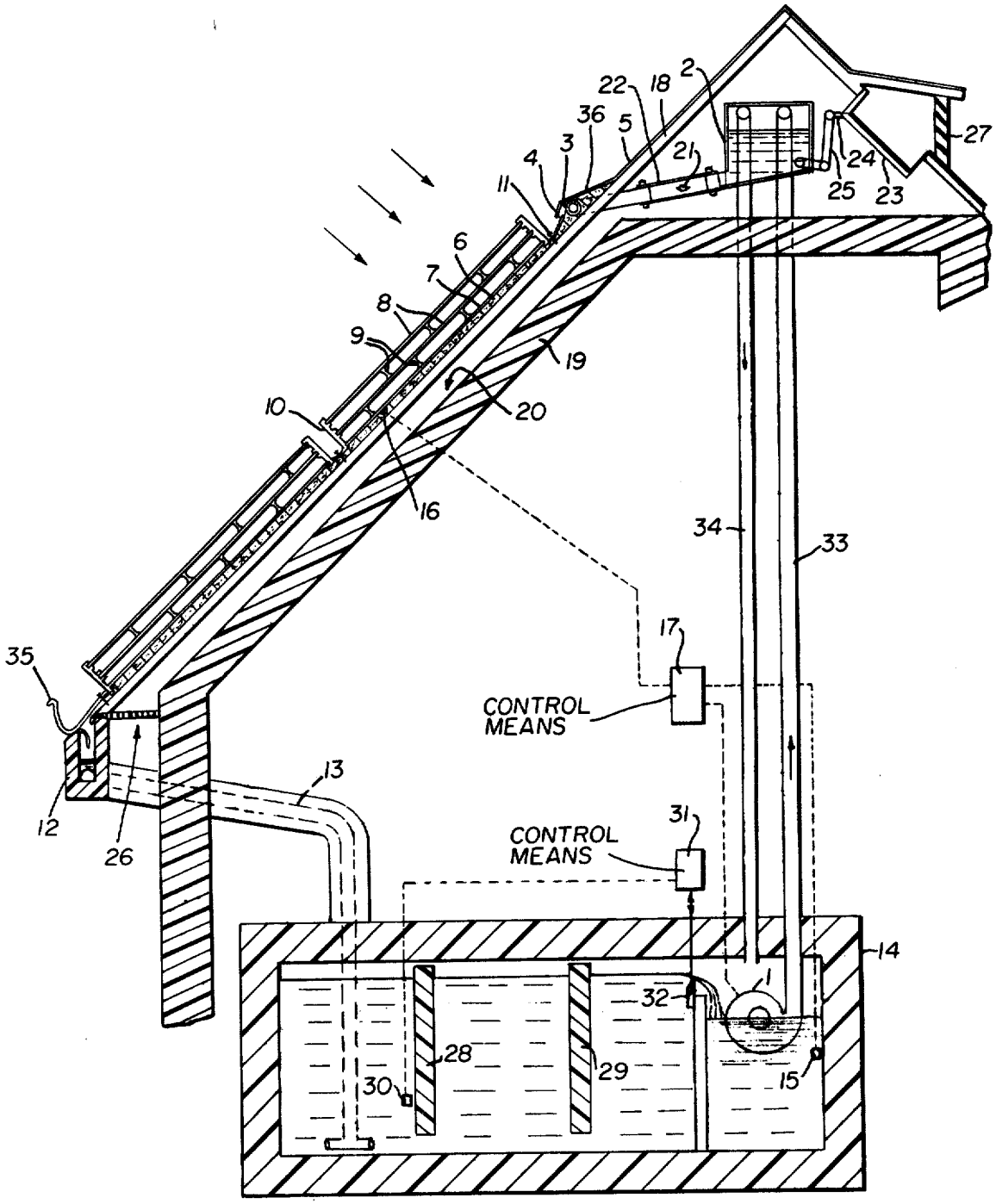
FIG. 1 is a partially sectioned view of a heat collecting system according to this invention, showing the construction of the collector, the method of controlling water circulation, and a device for controlling circulation of cooling air.
Figure 2:
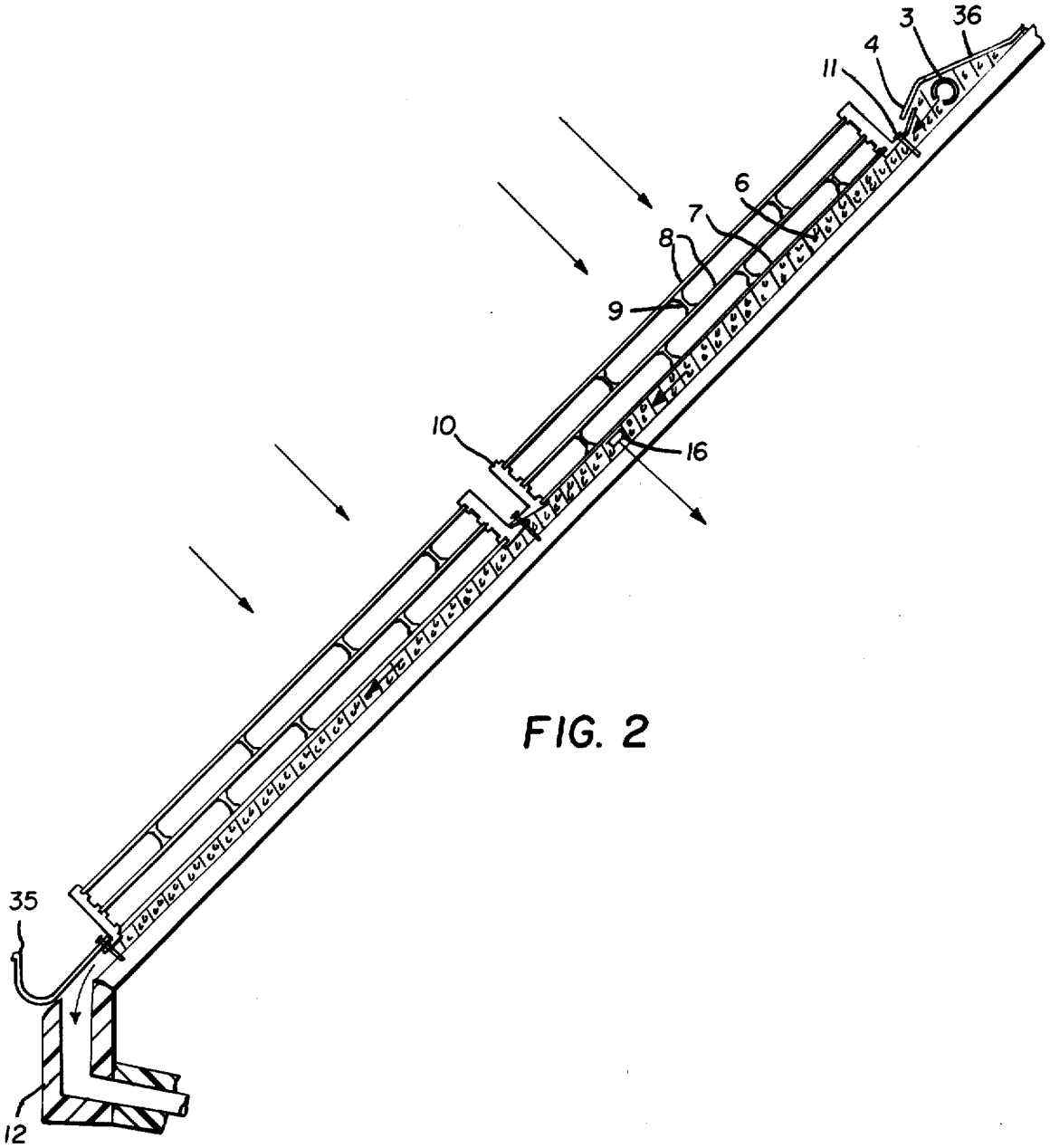
FIG. 2 is an enlarged detail view of a portion of FIG. 1.

Water is elevated by a pump 1, to a tank 2, above the top of the solar collectors. It flows from tank 2, down to a header 3, and out through a plurality of holes in the header on to the surface of the roofing 5. An entrance wing 4, may be provided to guide the water flow under the collectors.

Under the collectors the water flows in a thin mat of wettable fibers 6, which keeps the flow in contact with the lower surface of the absorber plate 7, and uniformly distributed under the area of the plate.

The top surface of the absorber plate 7, which may have a selective black coating to increase the absorption of sunlight and reduce the radiation of infra-red heat energy, is protected from weathering and convective heat loss by transparent covers 8, maintained in spaced relationship by spacing posts 9. The spaces between the covers and the plate are sealed at the edges by a flexible edge strip 10, which may be extruded with a suitable contoured section.

Nails 11, may be driven trhough an outward flap of edge strip 10, into roof boards 18, to secure the collector panels, and these flaps may be assembled in lapped relation to direct the water flow under successive panels. At the lower edge of the roof it falls into an insulated gutter 12, and flows through an insulated pipe 13, to the insulated storage tank 14.

The water circulation pump only runs when there is useful heat to be collected. A sensor 15, near the pump inlet senses the temperature of the water in the reservoir, and a second sensor 16, at the collector senses the temperature of the collector. A control device 17, of a kind well known in the art, responds to activate pump 1, whenever the temperature at 16, is greater than the temperature at 15. Hysteresis and time delay features may be included in the control device in known ways to stabilize its operation for effective water circulation only when useful heat is available.

When the sun is shining on the collector plate 7, the heat absorbed will be partially transmitted through the fibrous mat 6, to the roofing material 5. Behind the roofing it will pass through the roof boards 18, across the air space 20, and through the insulation layer 19, into the interior of the house. In normal operation, this flow of heat represents a loss, since the desired path is with the flow of water down into the gutter 12, and into the tank 14. At the top of the air space 20, is flap valve or damper 23, shown in its closed position, which keeps the air in the space 20 stagnant and resistive to the flow of heat. The damper 23 is held in its closed position against gravity by the weight of water in the tank 2, acting through the link 25.

If the water-flow stops, tank 2 empties and, pivoting upward about center 21, flexing the hose connection 22, and two similar hose connections, not shown, in lines 33 and 34, it allows the damper 23 to swing downward about pivot 24 and open. Ambient air then rushes in through vent 26, up through the air space 20, and out through the vent 27, driven by natural convection. As it goes, it absorbs heat from the roof boards 18, thus keeping the roofing 5 from reaching damaging temperatures.

It will be evident to those skilled in the art that control of the emergency cooling air flow in space 20 could be accomplished in other ways, for example by electrical temperature, liquid level, or power voltage sensors acting through a solenoid actuated damper or an air-circulating fan.

The water in the heat-storage tank 14, may be segregated by insulating partitions 28 and 29, into regions of different temperature, as taught by my co-pending patent application for HEAT STORAGE TANK, Ser. No. 625,061, filed Oct. 23, 1975 and now U.S. Pat. No. 4,010,731. It may be desired to maintain the water in the hottest region at a particular temperature, for example a temperature of 140° F. which would be suitable for domestic hot water supply. For this purpose, a temperature sensor 30, immersed in the water acts through a controller 31, to adjust a gate 32, controlling the flow of water to the entrance of pump 1. Thus the pump drives a mixture of air and water up the pipe 33 into the tank 2. Since a considerable amount of enthalpy would be wasted if this hot moist air were allowed to escape, it is returned to tank 14, through pipe 34. By this means the rate of water flow can be reduced when a higher temperature rise in the collector is called for, or increased when a satisfactory temperature exists at sensor 30.

Suitable heat exchangers and heat delivery systems not shown, are required to transfer heat from the heat storage tank 14 to use areas in the house. Such devices are well known to those skilled in the art.

Cold water from rain or melting snow, which does not contribute to heating, should not be allowed to enter the heat reservoir. A deflector 36 leads rain water over the header pipe 3, and water flowing down the outside of the collectors collects in the gutter 35 for separate disposal. The controller 31 may be a conventional servo mechanism.

I claim:

1. A solar heating system having at least one roof mounted panel for collecting heat from the sun, said panel having an upper sunlight-absorbing surface, at least one translucent cover mounted above the panel to protect it from the weather, said panel having a lower surface for heat transfer to a stream of water, means for mounting said panel in cooperative relation with a roof to form a passage for said stream of water, means connected to said panel for maintaining said stream of water in substantially uniform contact with said lower surface of said panel, insulated tank means connected for receiving and storing said stream of water, and means for controlling said stream of water under said panel in response to the temperature of said panel and said water in said tank, whereby said water collects heat from said panel at useful temperatures, and air stream means for preventing said roof from overheating.

2. A system according to claim 1, in which said panel has one cover supported above it by spacers and another cover supported above the first cover by spacers and a flexible sealing strip secured in substantially leak-tight relation to the edges of said covers and said panel, so as to exclude water from the spaces between said covers and said panel.

3. A system according to claim 2, in which said means for maintaining said stream of water in substantially uniform contact with said lower surface of said panel comprises a mat of wettable fibrous material pressed between said panel and said roof.

4. A system according to claim 1, in which said means for controlling said stream of water under said panel includes a pump for raising water from said storage tank to an upper tank at a height above the top of said collector panel, a temperature sensor for detecting the temperature of water entering said storage tank, and valve means for controlling the flow of water to the entrance of said pump responsive to the temperature of said entering water, whereby the flow of water to the collector panel is reduced when the temperature of the water entering the storage tank is lower than desired.

5. A system according to claim 1, in which said means for preventing said roof from overheating includes an air passage in heat exchange contact with said roof and control means responsive to said water stream whereby said air passage is closed when said water stream is flowing but open to pass a cooling air stream when said water stream is not flowing.

6. A solar heating system having at least one roof mounted panel for collecting heat from the sun, said panel having an upper sunlight-absorbing surface, at least one translucent cover mounted above the panel to protect it from the weather, said panel having a lower surface for heat transfer to a stream of water, means for mounting said panel to form a passage for said stream of water, means connected to said panel for maintaining said stream of water in substantially uniform contact with said lower surface of said panel, insulated tank means connected for receiving and storing said stream of water, and means for controlling said stream of water under said panel in response to the temperature of said panel and said water in said tank, whereby said water collects heat from said panel at useful temperatures[,] *and* in which said panel has one cover supported above it by spacers and another cover supported above the first cover by spacers and a flexible sealing strip secured in substantially leak-tight relation to the edges of said covers and said panel so as to exclude water from the spaces between the said covers and said panel.

7. A system according to claim 6, in which said means for maintaining said stream of water in substantially uniform contact with said lower surface of said panel comprises a mat of wettable fibrous material.

8. A solar heating system having at least one roof mounted panel for collecting heat from the sun, said panel having an upper sunlight-absorbing surface, at least one translucent cover mounted above the panel to protect it from the weather, said panel having a lower surface of heat transfer to a stream of water, means for mounting said panel to form a passage for said stream of water, means connected to said panel for maintaining said stream of water in substantially uniform contact with said lower surface of said panel, insulated tank means connected for receiving and storing said stream of water, and means for controlling said stream of water under said panel in response to the temperature of said panel and said water in said tank, whereby said water collects heat from said panel at useful temperatures[,] *and* in which said means for controlling said stream of water under said panel includes a pump for raising water from said storage tank to an upper tank at a height above the top of said collector panel, a temperature sensor for detecting the temperature of water entering said storage tank, and valve means for controlling the flow of water to the entrance of said pump responsive to the temperature of said entering water, whereby the flow of water to the collector panel is reduced when the temperature of the water entering the storage tank is lower than desired.

9. A solar collector comprising *a panel having* an upper sunlight-absorbing surface, [at least one translucent cover mounted above the panel to protect it from the weather,] said panel having a lower surface for heat transfer to a stream of water, means for mounting said panel to form a passage for said stream of water, and a mat of wettable fibrous material in said passage for maintaining said stream of water in substantially uniform contact with said lower surface of said panel.

10. A solar heating system having at least one roof mounted panel for collecting heat from the sun, said panel having an upper sunlight-absorbing surface, [at least one translucent cover mounted above the panel to protect if from the weather,] said panel having a lower surface of heat transfer to a stream of water, means for mounting said panel to form a passage for said stream of water, *wettable mat* means in said passage connected to said panel for maintaining said stream of water in substantially uniform contact with said lower surface of said panel, insulated tank means connected for receiving and storing said stream of water, and means for controlling said stream of water under said panel in response to the temperature of said panel and said water in said tank, whereby said water collects heat from said panel at useful temperatures, said means for maintaing said stream of water in substantially uniform contact with said lower surface of said panel comprises a mat of wettable fibrous material.

* * * * *